United States Patent [19]

Daly

[11] 4,412,590

[45] Nov. 1, 1983

[54] ROCK BIT INTERNAL LUBRICANT PUMP

[75] Inventor: Jeffery E. Daly, Houston, Tex.

[73] Assignee: Reed Rock Bit Company, Houston, Tex.

[21] Appl. No.: 227,822

[22] Filed: Jan. 23, 1981

[51] Int. Cl.³ .................................... E21B 10/22
[52] U.S. Cl. ................................ 175/229; 175/337
[58] Field of Search ............... 175/229, 337; 308/8.2; 384/93, 94

[56] References Cited

U.S. PATENT DOCUMENTS

| | | | |
|---|---|---|---|
| 3,125,175 | 3/1964 | Medlock et al. | 175/337 |
| 4,109,974 | 8/1978 | Suanstrom et al. | 308/8.2 |
| 4,167,219 | 9/1979 | McQueen | 175/229 |
| 4,167,220 | 9/1979 | Ernst et al. | 175/229 |
| 4,181,185 | 1/1980 | Keller et al. | 175/229 |
| 4,183,416 | 1/1980 | Walters | 175/229 |
| 4,333,691 | 6/1982 | Cooper | 308/8.2 |

*Primary Examiner*—Stephen J. Novosad
*Assistant Examiner*—William P. Neuder
*Attorney, Agent, or Firm*—Michael J. Caddell

[57] ABSTRACT

A rolling cutter rock drilling bit is disclosed which features an internal lubricant pump utilizing an internal elastomeric member moving across a grooved rigid surface to circulate lubricant in the bit bearings as a result of the shear forces on the lubricant created when the elastomer moves across the grooves.

4 Claims, 11 Drawing Figures

ROCK BIT INTERNAL LUBRICANT PUMP

BACKGROUND OF THE INVENTION

The present invention generally relates to rock drilling bits of the rolling cutter variety and more specifically is directed to an internal lubrication system for a rolling cutter bit.

Conventional rolling cutter drill bits in use today generally utilize a lubrication system which could be classified as a static system. Basically, the system comprises a lubrication supply channel connected to a lubrication reservoir. Usually the lubrication reservoir has a spring-loaded plunger or other resilient biasing means to maintain a continual pressure on the lubricant in hopes that it will force a regular supply of the lubricant into the bearing area. Other types of lubricant supply systems which have been tried in prior devices include downhole electric motor-driven pumps, hydraulic pumps driven by the well fluids being pumped down the borehole during the drilling operations and gear-driven pumps driven by the rotation of the drill string during the drilling operation. Generally these types of pumping systems are complex, heavy, and take up considerable additional space in the drilling equipment, which space is sometimes a critical limitation and may not be available for such devices. The widespread system comprising the spring-loaded reservoir usually does not provide a positive circulation of lubricant through the critical bearing area in the rock bit and thus does not give the needed lubricant protection. The present invention overcomes the deficiencies of the conventional methods by providing a highly efficient, extremely powerful internal lubricant pump requiring no additional room in the drill bit design yet allowing extremely strict control over the pumping action and providing a positive lubricant displacement system in the critical bearing area. The present invention provides a pumping system utilizing the shear forces on the lubricant which are generated by placing a grooved rigid surface in contact with a sliding elastomeric surface to provide positive displacement of the lubricant through the bit structure.

DESCRIPTION OF THE PREFERRED EMBODIMENTS

Figure 1:
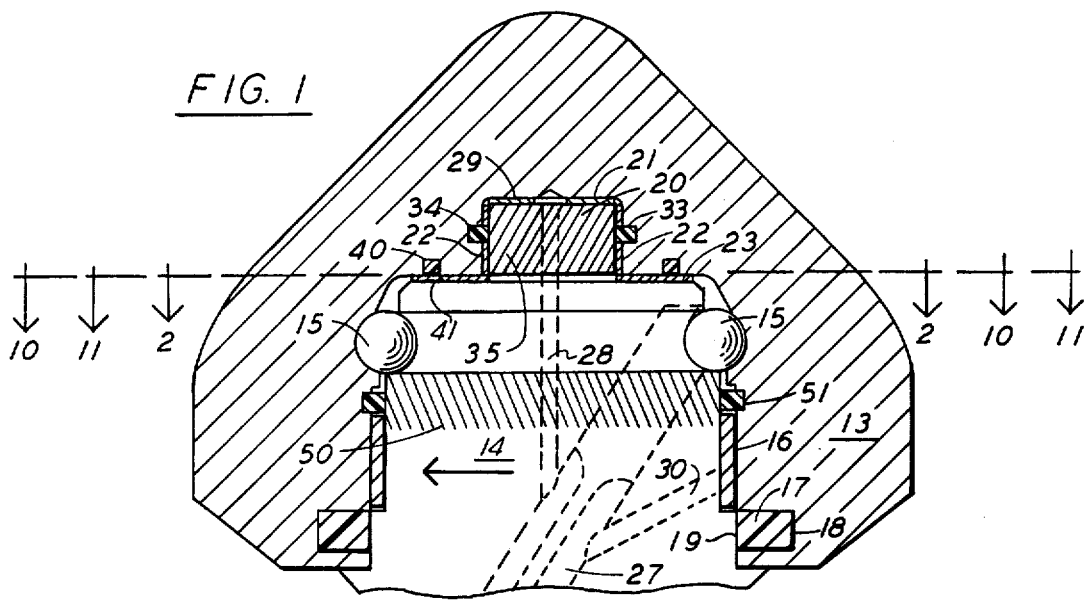
FIG. 1 is a partial cross-sectional view of a typical cutter-lug assembly of a tri-cone rolling cutter drill bit.

Referring now to all of the drawings and more particularly to FIG. 1, this figure illustrates in partial cross-sectional view the present invention as utilized in a lug assembly of a typical tri-cone rolling cutter drill bit. This lug assembly is illustrated in part in FIG. 1 and comprises approximately one-third of a complete bit with the other two-thirds of the bit being generally similar in construction and make-up to the lug assembly, thus the illustrated lug assembly is typical of the other two lug assemblies found in rolling cutter drill bits. In the lug assembly partially illustrated in FIG. 1, a lug member is formed having an upper pin section and a lower journal or leg section. When the three lug members are welded together to form a complete rolling cutter drill bit, pin section is exteriorly threaded by methods such as machining in order to form a connector for interconnection into a drill string.

At the lower end of each lug member is located a rolling cutter 13 mounted on a generally cylindrical bearing shaft 14 by bearing means such as ball bearings 15 and friction bearings 16. Friction bearings 16 generally comprise a relatively soft bearing material plated on a relatively hard bushing formed in a cylindrical sleeve for snug-fitting relationship on the cylindrical bearing journal 14. The bearing journal 14 and the cutter 13 will normally have polished surfaces for sliding contact with sleeve bearing 16. Likewise, the bearing journal 14 and the cutter 13 will have complementary ball bearing races formed therein for engagement with ball bearings 15. It is, however, contemplated that the friction sleeve bearing 16 may be replaced by cylindrical roller bearings or tapered roller bearings. A radial seal member 17, preferably formed of a tough resilient elastomer, is located in a radial recess 18 formed in cutter 13 and bears against a smooth sealing surface 19 formed on bearing journal 14. Seal member 17 seals between the rolling cutter 13 and the bearing journal 14 to prevent intrusion of contaminants, corrosives, and detritus from the well bore area into the critical bearing area containing the bearings 15 and 16. Likewise, seal 17 contributes to the maintenance of lubricant in the bearing area and prevents migration of the lubricant out of this critical area.

At the outer end of bearing journal 14 is a friction pin or pilot pin 20 formed integrally with the journal 14. A pin cavity 21 slightly larger than pin 20 is formed in rolling cutter 13 to receive the friction pin. Normally a hard bearing material such as stellite will be located at 22 in a radial formation around cavity 21 to provide a bearing surface contact with friction pin 20. Likewise, a thrust bearing 23 may be formed in annular face of the cutter or the bearing journal between friction pin 20 and main journal 14. Bearing 23 is also preferably formed of a relatively hard material such as stellite or may comprise a multi-segment bearing of a dual bearing material such as stellite and aluminum bronze segments.

A bearing lubrication supply system is formed internally in the lug assembly and comprises a lubricant reservoir (not shown) which communicates via passaging with a lubricant bore in the journal 14. This bore intersects ball bearing loading channel 27 which in turn has a bearing supply bore 28 extending through pin 20 into the axial space 29 between pin 20 and the cutter. A second bearing supply channel 30 communicates from ball bearing channel 27 to the friction bearing surface of the journal in the region contacting bearing sleeve 16. Normally a solid or semi-solid lubricant such as a heavy grease would be loaded in the lubricant reservoir filling channels, 27, 28 and 30.

In the present invention, the provision for pumping the lubricant into and circulating throughout the bearing area comprises a circular radial seal member 33 located in the cutter body in a complementary recess 34 passing circumferentially therein in close proximity around friction pin 20. Seal member 33 is arranged for resilient continuous contact with pin member 20. Conjointly with the action of elastomeric seal member 33 against pin member 20 there are a set of slanted grooves 35 formed in the cylindrical surface of pin member 20. In the embodiment shown in FIG. 1, the grooves slant from left to right as you move from the base of pin 20 to the outward extremity. In the normal configuration of a rolling cutter drill bit, the cutter will rotate such that the right hand side of the cutter will be moving outward from the figure and the left hand side of the cutter would be moving inward into the paper. Thus the portion of seal member 33 located to the right of pin member 20 would move from right to left across grooves 35 as the bit rotates in the borehole. This movement of seal 33 across grooves 35 works to force grease down the grooves towards the base of pin 20. The grease then is forced around the ball bearings 15 below friction bearing 16 and into relief passage 30. Replacement grease flows from passage 28 into the space 29 between pin 20 and the cutter. This lubricant then is drawn into grooves 35 and enters the pumped circulation cycle just described. Thus a closed lubricant cycle is shown consisting of the supply passage 28 via clearance 29, the grooves 35, the ball bearing and friction bearing areas and the return passage 30.

Figure 8:
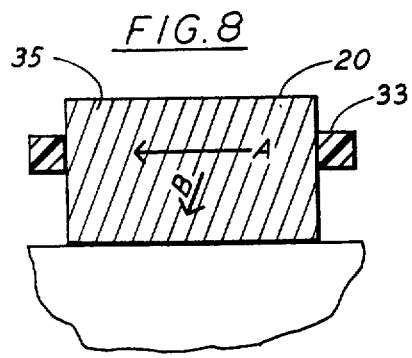
FIGS. 8 and 9 are broken out partial views of a grooved bearing journal.
Figure 9:
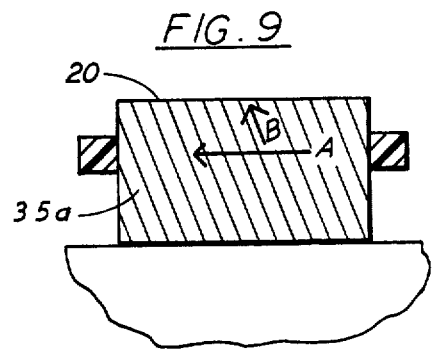

FIG. 8 is an expanded broken out view of pin 20 showing the direction of seal movement across the pin and also the direction of slant of the grooves in the pin cylindrical surface. The directional arrow A indicates the direction of movement of the seal 33 across the pin. The directional arrow B indicates the direction that lubricant is pumped as a result of the movement of the seal across the grooves. In FIG. 9, an alternate embodiment is disclosed in which the grooves are slanted in the opposite direction such that when the seal moves in the direction A lubricant is pumped in direction B. In the embodiment of FIG. 9, the lubricant would move out from the grooves on the pin into the space between the end of the pin and the cutter and from there through passage 28 and out passage 30 into the bearing area around friction sleeve 16. The lubricant would then move around sleeve 16, ball bearings 15, and back to the grooves 35.

Figure 2:
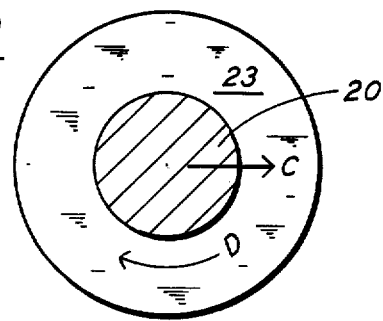
FIG. 2 is a radial view of the cutter assembly of FIG. 1 taken at Line 2—2 therein.

Referring now to FIG. 2, a partial cross-sectional view of the rolling cutter bit embodying the present invention is shown. FIG. 2 is a view taken at Line 2—2 of FIG. 1 to clarify the direction of rotation in a typical rolling cutter bit. Normally the view taken at Line 2—2 would be a radial outward view taken in the vicinity of the central longitudinal axis of the bit, looking outward toward the inwardly directed journals upon which the rolling cutters are mounted. As shown in FIG. 2, the journal moves to the right as indicated by arrow C causing the cutter to rotate in a clockwise direction as shown by arrow D.

Figure 3:
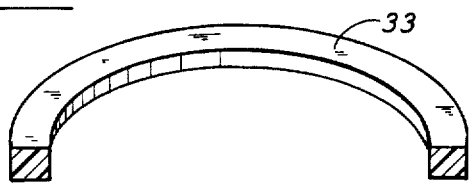
FIG. 3 is a cross-sectional isometric view of a circular seal for use in the invention of FIG. 1.
Figure 4:
FIGS. 4-7 illustrate alternate cross-sectional configurations for the seal of FIG. 3.
Figure 5:
Figure 6:
Figure 7:

FIG. 3 is a cross-sectional isometric view of a typical elastomeric seal member which can be utilized in the present invention. Seal member 33 as shown in FIG. 3, has a square cross-sectional configuration and a generally circular overall configuration. FIGS. 4–7 represent a series of varied cross-sectional configurations for the seal member 33. These configurations range from the square cross-section as shown in FIG. 3 to the elongated oval cross-section, with other possibilities including circular cross-section and rectangular cross-section.

FIGS. 8 and 9 represent alternate embodiments of the invention and further disclose the effect of changing the slant direction of the grooving on the pin 20.

Figure 10:
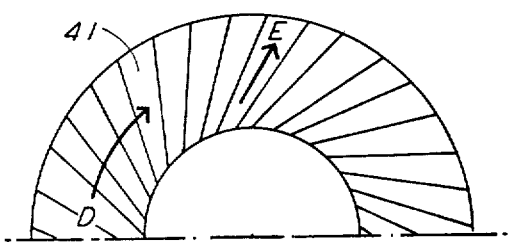
FIGS. 10 and 11 are broken out partial views of a grooved thrust face.
Figure 11:
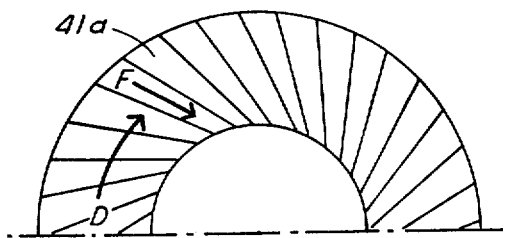

A different embodiment of the invention is disclosed in FIGS. 10 and 11 wherein a flat, annular pumping surface is disclosed as opposed to the cylindrical pumping surface on pin 20 of FIG. 1. In the embodiment of FIGS. 10 and 11 a set of slanted radial grooves are formed in the thrust surface area indicated at 23 in FIG. 1. Although the grooves can be formed in either the journal thrust face or the cutter thrust face, preferably the grooves are formed in the journal 14. In this situation, an elastomeric pump member must be located in the opposing face to resiliently engage the grooved face. The location of such a member is indicated at 40 in FIG. 1. FIG. 10 is a partial broken out view of the grooved annular surface 23 on journal 14. In this view, the grooves 41 are shown slanting to the right and the movement of the elastomeric seal member past the grooves is indicated by arrow D. The resulting pumping action of lubricant through the grooves is indicated at arrow E resulting from the rightward slant of grooves 41. FIG. 11 offers another embodiment similar to that of FIG. 10 in which the slanting of the pumping grooves 41a is oriented in the left hand direction such that a rotation of the elastomeric member in direction D results in a pumping action of lubricant in the direction of arrow F.

Yet another embodiment of the invention is disclosed in FIG. 1 in which a set of slanted partially helical grooves 50 are formed on the cylindrical exterior surface of journal 14 and work in conjunction with a radial seal 51 to pump lubricant therethrough. In the embodiment shown, the right hand portion of radial seal 51 will be moving upward from the figure and the left hand portion of seal 51 will be moving downward into the figure such that the movement of the seal member 51 across grooves 50 will be from right to left. This right to left movement of the seal member in conjunction with the left hand slope of the grooves 50 will serve to pump lubricant from seal member 51 toward the ball bearing assembly 15 and into the thrust pin area 20 whereupon the lubricant will move down passage 28 and be recycled through passage 30 back into the pumping area.

Thus, in the above description and related figures several embodiments of the invention are shown wherein relatively parallel grooves are formed on cylindrical surfaces on the bearing journal of a rolling cutter bit and mating elastomeric seal members are placed in the adjoining surfaces of the cutter to abut the grooved surfaces. The action of the seal member in conjunction with the grooved surfaces provides a highly efficient lubricant pump within the rolling cutter drill bit which requires no additional moving parts or lubricant capacity in the conventional drill bit design. Additional embodiments involve the use of grooved surfaces and elastomeric abutment members on annular surfaces rather than the cylindrical surfaces. It is believed that the pump works through a combination of factors primarily involving the partial extrusion of the elastomer into the groove area and also arising from the sheer forces generated in the lubricant as the elastomer moves across the lubricant interface. In the first of these factors, the abutment of the elastomer with the grooved surfaces naturally allows a small area of elastomer to be pushed downward into the groove. As the elastomer moves across the groove, this small portion of the elastomer slides down the groove pushing the lubricant ahead of it, thus providing the desirable pumping action. In addition, because of the high viscosities of the solid and semi-solid lubricants generally utilized in this type of drilling equipment, the movement of the elastomer across the lubricant face introduces relatively high shear in the lubricant and drags the lubricant along with the elastomer thus adding to the pumping action. Thus, it can be seen that by providing a grooved surface within the rolling cutter assembly and a mating elastomer seal to abut and slide across the grooved surface, the highly efficient lubricant pump can be introduced into the rolling cutter assembly which occupies a negligible amount of additional space yet provides a desirable circulating action in the lubricant supply. This circulating action maintains a constant lubricant on the critical bearings and in the critical thrust area in the drill bit and greatly extends the bearing life of the bit.

The amount of pumping obtained from the internal lubricant pumping system herein disclosed and the pumping pressure obtained can be varied according to several different parameters. For example the hardness of the elastomer can be increased to increase peak pressure and/or decrease volume. The length and width of the grooves and the width of the elastomer can be adjusted to vary pumping rates and/or pressures. The amount of slant in the grooves can be varied to vary pressure and rate. The direction of slant of the grooves can be changed to reverse the flow direction of the lubricant. The number of grooves and the depth of the grooves can be varied to change flow rates and pressures. Thus an infinite variety of combinations provides a large selection of pressures and flow rates for the pumping system.

Although certain preferred embodiments of the present invention have been herein described in order to provide a general understanding of the principles of the invention, it will be appreciated that various changes and innovations can be effected in the described internal lubricant pumping system without departing from these principles. For example, whereas there are disclosed embodiments of the invention utilizing the cylindrical journal areas and the annular thrust areas as the pumping mechanism, one could also place grooves in the extreme end of the friction pin and place a resilient seal member in the cutter to provide the pumping action. Also, whereas most of the embodiments utilize semi-helical grooves formed on the bearing journal with an elastomer member located in the cutter body, it is clear that the locations of these could be switched and the elastomer placed in the bearing journal with the pumping grooves being formed in the cutter internal areas. Other changes would be apparent to one skilled in the art and therefore the invention is declared to cover all changes and modifications of the specific examples of the invention herein disclosed for purposes of illustration which do not constitute departures from the spirit and scope of the invention.

The embodiments of the invention in which an exclusive property or privilege is claimed are defined as follows:

1. A bearing assembly for a rolling cutter drill bit comprising:
    a generally cylindrical bearing journal constituting a first bearing member;
    a roller cutter, constituting a second bearing member, having a recess of generally circular section therein receiving the journal;
    bearing means between the journal and the roller cutter for rotatably mounting the roller cutter on the journal; and
    a lubricant circulation system for circulating grease past the bearing means comprising seal means between the roller cutter and the journal for holding grease in the space therebetween, passaging in the journal having a first channel opening to the space between the journal and the roller cutter generally at one side of said bearing means and a second channel in fluid communication with the first channel and opening to the space between the journal and the roller cutter generally at the opposite side of the bearing means, grooving in the surface of one of said bearing members, and a ring of resilient material carried on the other of said bearing members and engageable with said grooving, whereby, upon rotation of the roller cutter on the journal, the ring forces grease to move through said grooving for pumping the grease past the bearing means, through the space between the journal and the roller cutter, and through said channels to circulate the grease, the journal having a generally cylindrical shank portion, and a generally cylindrical pin portion concentric with but of smaller diameter than the shank portion at the end of the shank portion, thereby forming an annular shoulder on the journal, the grooving comprising a plurality of generally parallel grooves in the surface of the shank portion of the journal extending generally in the direction of the longitudinal axis thereof.

2. A bearing assembly for a rolling cutter drill bit comprising:
    a generally cylindrical bearing journal constituting a first bearing member, and having a generally cylindrical shank portion and a generally cylindrical pin portion concentric with but of small diameter than the shank portion at the end of the shank portion, thereby forming an annular shoulder of the journal;
    a roller cutter constituting a second bearing member, and having a recess of generally circular section therein receiving the journal;
    bearing means between the journal and the roller cutter for rotatably mounting the roller cutter on the journal; and
    a lubricant circulation system for circulating grease past the bearing means comprising seal means between the roller cutter and the journal for holding grease in the space therebetween, passaging in the journal having a first channel opening to the space between the journal and the roller cutter generally at one side of said bearing means and a second channel in fluid communication with the first channel and opening to the space between the journal and the roller cutter generally at the opposite side of the bearing means, grooving in the surface of one of said bearing members, and a ring of elastomeric material carried on the other of said bearing members and engageable with said grooving for partially entering the grooving, whereby, upon rotation of the roller cutter on the journal, the ring forces grease to move through said grooving for pumping the grease past the bearing means, through the space between the journal and the roller cutter, and through said channels to circulate the grease.

3. A bearing assembly as set forth in claim 2 wherein the grooving comprises a plurality of generally parallel grooves in the surface of the pin portion of the journal extending generally in the direction of the longitudinal axis thereof.

4. A bearing assembly as set forth in claim 2 wherein the grooving comprises a plurality of grooves in the shoulder of the journal extending generally radially with respect to the journal.

* * * * *